Aug. 25, 1959 — M. M. BOTTEMILLER — 2,901,028
SEAT CONSTRUCTION
Filed March 1, 1957 — 3 Sheets-Sheet 1

INVENTOR
MERTON M. BOTTEMILLER
BY Frederick C. Lange
ATTORNEY

Aug. 25, 1959   M. M. BOTTEMILLER   2,901,028
SEAT CONSTRUCTION
Filed March 1, 1957
3 Sheets-Sheet 2
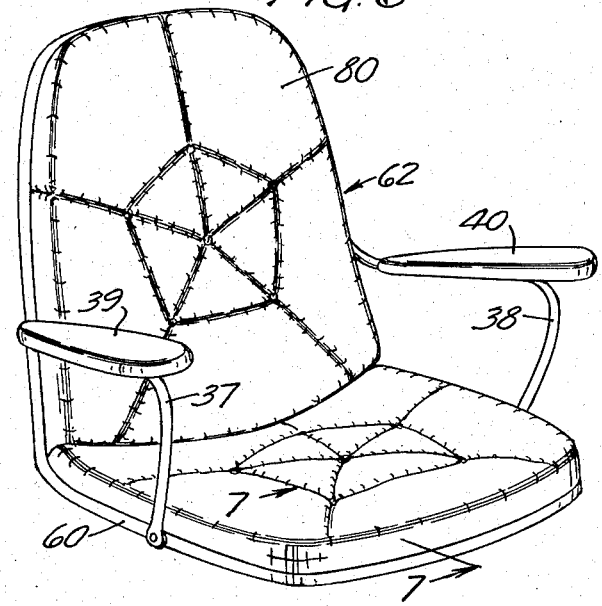
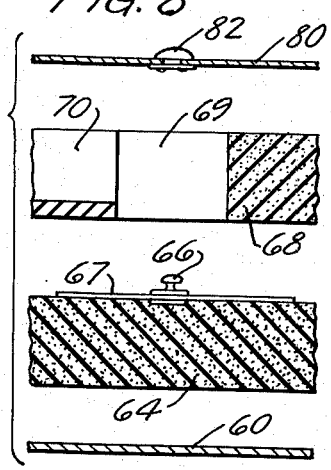
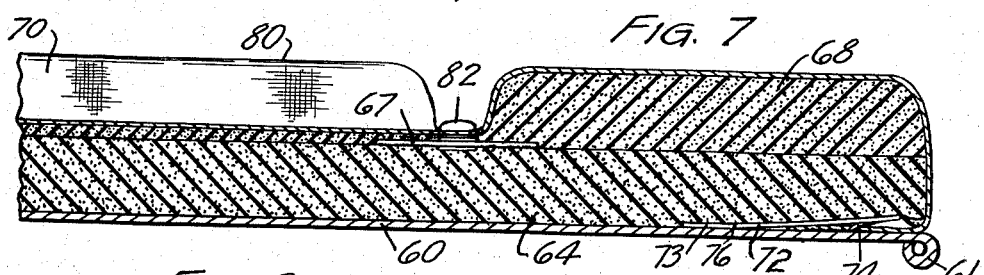
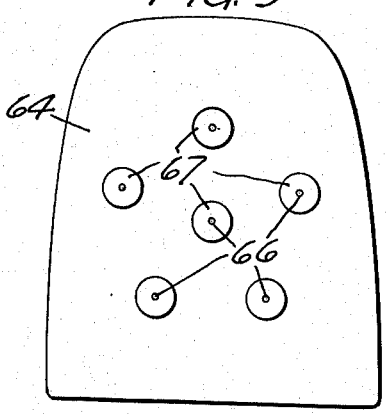
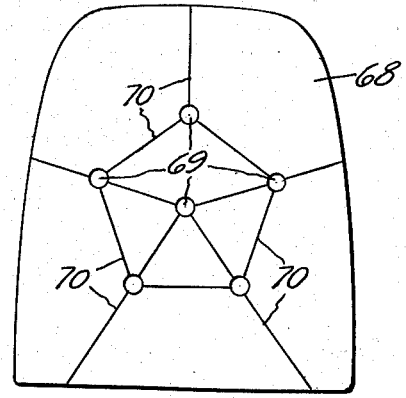
INVENTOR
MERTON M. BOTTEMILLER
BY Frederick E. Lange
ATTORNEY Aug. 25, 1959  M. M. BOTTEMILLER  2,901,028
SEAT CONSTRUCTION
Filed March 1, 1957  3 Sheets-Sheet 3
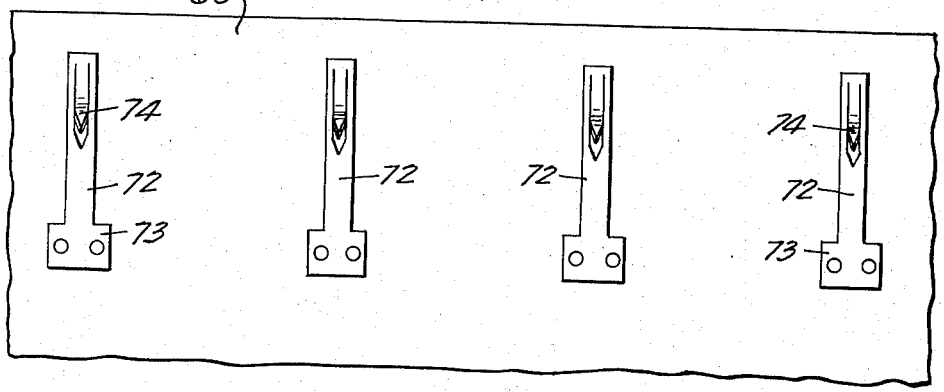
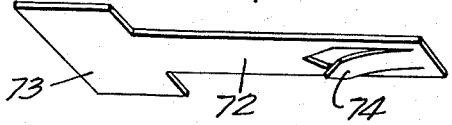
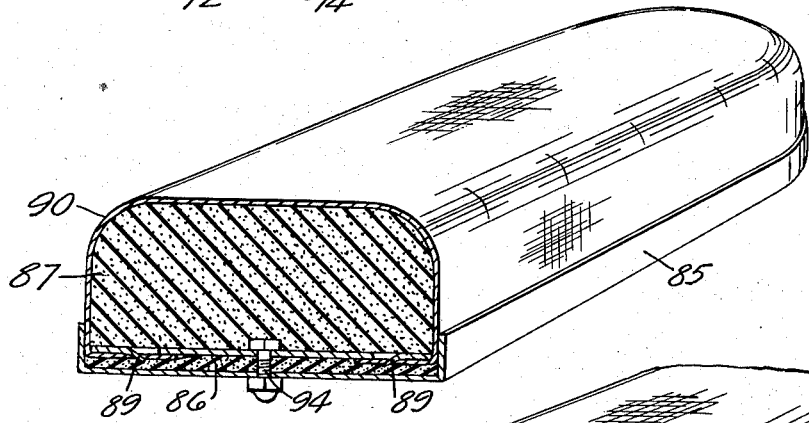
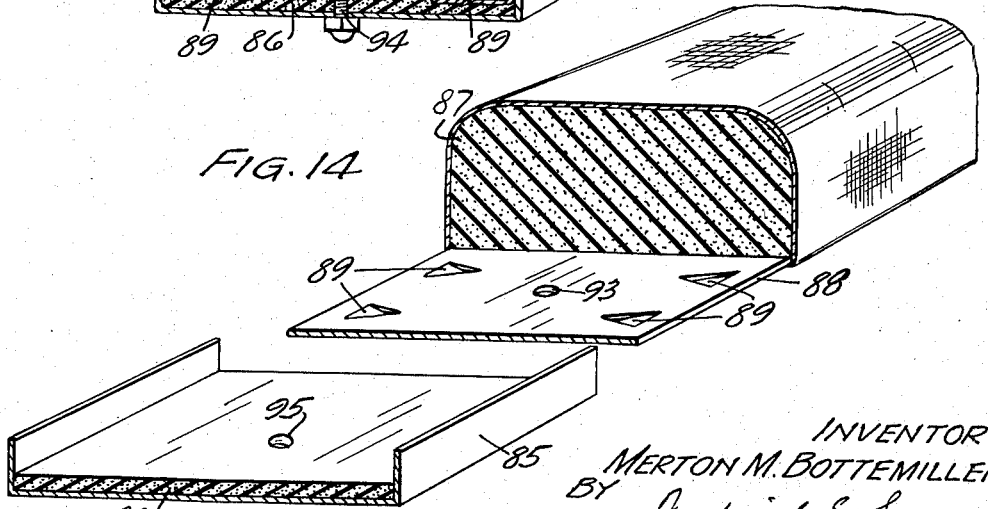
INVENTOR
MERTON M. BOTTEMILLER
BY Frederick E. Lange
ATTORNEY

United States Patent Office 2,901,028
Patented Aug. 25, 1959

2,901,028

SEAT CONSTRUCTION

Merton M. Bottemiller, Wadena, Minn.

Application March 1, 1957, Serial No. 643,371

7 Claims. (Cl. 155—184)

The present invention is concerned with a seat construction, and more particularly with one which provides for quickly applying or replacing a cover thereto.

An object of the present invention is to provide a seat construction in which the cover material is firmly but detachably held over a pad of resilient material both at its edges and over the main portion of the material.

A further object of the invention is to provide such an arrangement in which gripping means disposed adjacent the under side of the resilient pad is employed to grip and detachably hold the edge portion of the cover.

A further object of the invention is to provide in such a seat construction a pad of resilient material formed of portions with grooves therebetween in which there is means for detachably securing the cover to the base adjacent such grooves so that the excess material in the cover is drawn into the grooves.

A further object of the invention is to provide a seat construction of the type referred to in the preceding object in which resilient members are detachably secured between the opposite edges of the seat base and extend into the grooves in the pad to resiliently hold the cover in such grooves.

A further alternative object of the present invention is to provide such an arrangement in which a plurality of snap members are employed to hold the cover material in position.

A further object of the invention is to provide such a seat construction in which gripping members for holding the edge of the cover material are urged into gripping position by the resiliency of the pad material.

A further alternative object of the invention is to provide such an arrangement in which resilient sheet metal gripping members are secured to the seat base to detachably hold the cover material in position.

A still further object of the invention is to provide a novel seat construction in which provision is made for readily re-covering chair arms as well as the back and seat portions of the seat construction.

Other objects of the invention will be apparent from a consideration of the accompanying specification, claims, and drawing, of which—

Figure 6 is an elevational perspective view of the back and seat portions of a chair employing a modified form of my improved seat construction;

Figure 7 is a partial sectional view taken along the line 7—7 of Figure 6 and in the direction of the arrows adjacent said line;

Figure 8 is an exploded sectional view of a portion of my seat construction of the type shown in Figure 6;

Figure 9 is an upper plan view of the lower pad of Figure 7;

Figure 10 is an upper plan view of the upper pad of Figure 7;

Figure 11 is a top plan view of a modified form of gripping arrangement for gripping the edge of the upholstery material, this gripping arrangement being shown in section in Figure 7;

Figure 12 is a bottom perspective view of one of the gripping members of the gripping arrangement shown in Figure 11;

Figure 13 is a perspective view having a section therethrough, of the arm construction; and Figure 14 is an exploded view of the arm construction of Figure 13.

Figure 1:
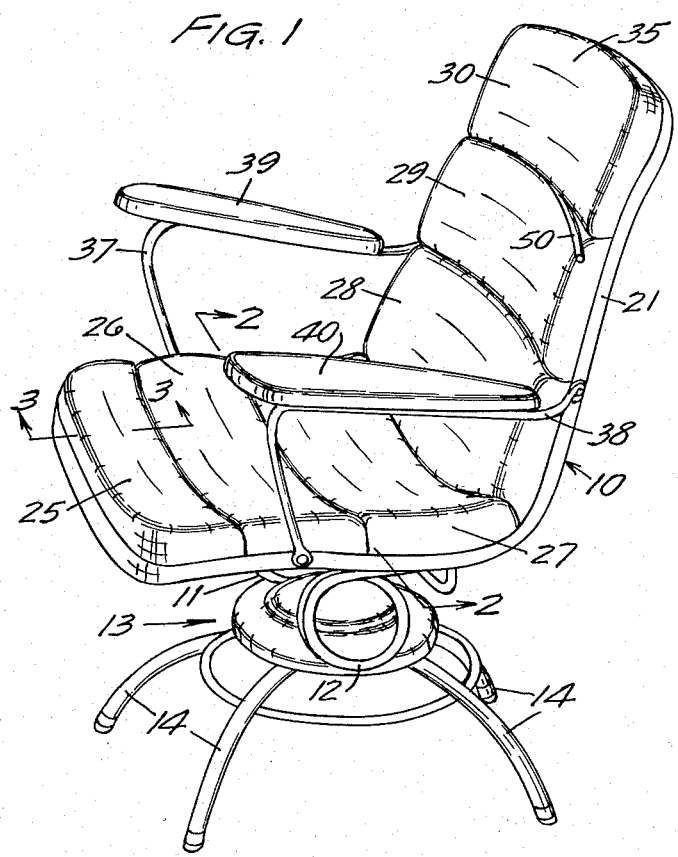
Figure 1 is an elevational, perspective view of a chair embodying my improved seat construction.

Referring more specifically to Figure 1, there is shown a chair of the swivel rocking type comprising a main chair seat 10 secured to coil springs 11 and 12, which are rigidly secured to a swivel unit 13 supported by a plurality of legs 14. The details of the base structure involving the springs 11 and 12, the swivel 13 and the legs 14 form no part of the present invention. A typical base structure of this type may be that shown in my co-pending application filed jointly with Alvin L. Engelmann on May 28, 1956, Serial No. 587,539.

Figure 2:
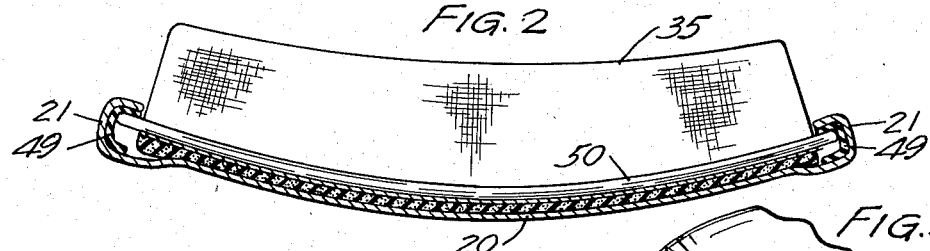
Figure 2 is a sectional view taken along the line 2—2 of Figure 1.

Referring to the chair seat construction, this consists of a seat base made of sheet metal which is formed to provide a seat and back portion, and which is rolled adjacent its edge to form a channel running around the entire periphery of the seat base. Specifically, the sheet metal base, as best shown in Figure 2, is designated by the reference numeral 20. This metal is bent near its outer edges to form a channel 21 which, as just indicated, extends around the entire periphery of the base 20. This channel has a dual function of acting as a reinforcing rib to impart rigidity to the formed sheet metal base, and also to provide for the retention of upholstery cover material in position, as will be presently described.

Secured to and covering the seat base member 20 are a plurality of sections 25, 26, 27, 28, 29, and 30 of resilient material such as foam rubber, the shape of which sections is readily apparent from Figure 1 even though they are shown covered with upholstery material. These foam pads are cemented to the sheet metal base 20 except adjacent their edge portions. Thus referring to Figures 3 and 4, the pad 25 is cemented to the base portion 20 outwardly to a line 27, leaving a peripheral portion adjacent the edge of the base which is not secured thereto. Each of the pads 25 to 30 is similarly secured by cementing to the base 20 except for a short distance adjacent to the outer edge of the base.

Disposed over the entire upholstery pad is a cover 35 of upholstery fabric. As will be presently described, this cover is resiliently retained snugly against the sections of the upholstery pad and the edge of the cover is secured between the base and the edge portions of the upholstery pad, which are not cemented to the base.

Secured to the base member 20, as by welding, are a plurality of chair arms 37 and 38. These chair arms may be formed of suitably shaped bar stock. Fastened to the chair arms 37 and 38 are a pair of chair pads 39 and 40, which may be formed in any suitable manner, one preferred manner being that shown in Figures 13 and 14. When thus formed, these arm pads are likewise provided with the means for detachably securing upholstery cover material thereto.

Figure 4:
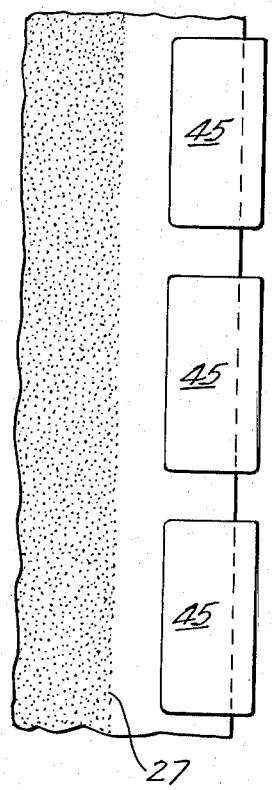
Figure 4 is a bottom plan view of the resilient pad used in my seat construction and showing one form of the gripping members employed to retain the upholstery cover in position.
Figure 3:
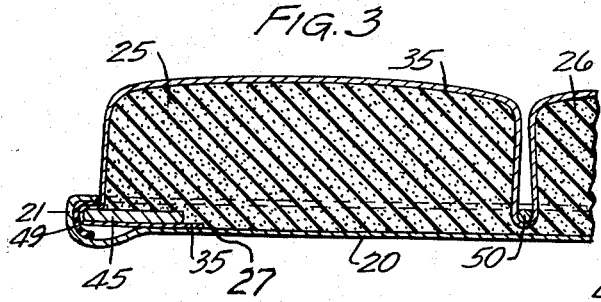
Figure 3 is a partial section taken along line 3—3 of Figure 1.
Figure 5:
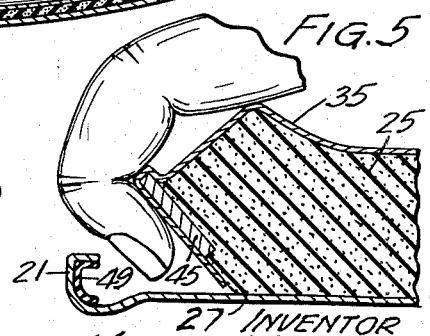
Figure 5 is a sectional view similar to the lefthand portion of Figure 3 showing the resilient pad compressed and withdrawn away from the seat base to permit the insertion of the edge of the upholstery cover.

Referring more specifically to the method of securing the cover 35 to the chair, it will be noted from Figures 3, 4, and 5 that there are a plurality of gripping members 45 which are secured to the under side of the pad sections. These gripping members extend along the under side of the pad sections around the entire periphery of the under side of the pad. The members 45 may be formed of a material such as hard fiber, and may be adhesively fastened to the resilient pad material. It will be noted from Figures 3, 4, and 5 that the gripping members 45 extend beyond the edge of the resilient pad into the channel 21. They are biased against the edge of the channel by the resiliency of the pad itself. As best shown in Figure 3, the edge of the cover 35 is brought around beneath the gripping members 45 and doubled back underneath the foam rubber pad. The edge of the cover is thus firmly held in position by the gripping action of gripping members 45, and by the tendency of the foam rubber to bear against the base 20 and hold the edge of the cover in position between the pad and the base. It will be obvious that upon an occupant sitting in the chair, the pad is pressed even more firmly against the base so as to grip the cover material even more firmly.

To increase the effect of gripping members 45, the channel 21 may be provided with a liner 49 of soft rubber or plastic, which may be cemented to the inside of the channel. In this way, the gripping members 45 serve to even more firmly retain the edge of the cover 35 in position.

In order to hold the main portion of the cover 35 against the pad without the presence of any wrinkles, I provide a plurality of spring wires 50, as best shown in Figures 2 and 3. These spring wires have a length slightly in excess of the distance between the interior walls of the opposite portions of channel 21, so that when they have their ends secured in these channels, as shown in Figure 2, they are bowed inwardly. These wires extend over the cover material into the grooves between the pad sections and serve to draw the cover material down into the grooves. The wires 50 may be removed at any time by bowing the wires outwardly and thus shortening their chordal length to permit their withdrawal from the channel 21 or by tilting the wires from the horizontal, which is possible because of the resilient compressibility of the foam pads.

The covering or re-covering of a chair embodying my novel seat construction can be accomplished in a relatively few minutes. The first step involves cutting a piece of cover material of the desired size and shape from the pattern which may be either an old cover or a paper pattern supplied by the manufacturer. The material is then laid in place on the resilient multi-section pad with the edge portions extending equally beyond the edges of the pad. The material is then consecutively tucked into the grooves between the pad sections. The edge portion of this cover material is now brought underneath the foam rubber pad and fastened in position. As shown in Figure 5, this is done by grasping the pad 35 and compressing the same edgewise. This withdraws the gripping members 45 on that portion of the pad being compressed from out of the channel 21, enabling the fabric 35 to be brought around beneath the gripping members 45 and beneath the pad. That portion of the pad is now placed back in position and allowed to expand so that the gripping members 45 are forced by the resiliency of the pad against the inner wall of channel 21. This process is repeated progressively around the edge of the pad until the entire edge of the cover is secured beneath the edge of the resilient pad sections. The various spring wires 50 are now inserted between the opposite portions of channel 21 into the grooves between pad sections 25 to 30.

One of these wires 50 is shown in Figure 1 in the process of being inserted. The wires 50 are forced into position as previously described by either tilting them from the horizontal or snapping them over center so that they bow inwardly as shown in Figure 2. This draws any excess material into the grooves between the pad sections, holding the main portion of the cover snugly against the pad.

When the cover is thus secured in position, it is under constant tension because of the resiliency of the pad, and will remain free of wrinkles. At any time, the cover can be quickly removed and replaced with a new cover within a relatively few minutes.

Modification of Figures 6 to 12

In Figures 6 to 12, I have shown a modified form of my seat construction in which are employed modified forms of both the gripping means for holding the edge of the cover and the means for detachably holding the main portion of the cover. In this modification, the means for holding the edge portion of the cover in position consists of metallic gripping fingers which are fastened to the base member, as by welding. Snaps are provided for holding the main portion of the cover to the seat base. In this modification, it is not necessary to provide a channel around the base as in the modification of Figures 1 to 5, since neither cover retaining means relies upon the existence of such a channel.

Referring specifically to the drawing and more particularly to Figure 6, there is shown the main seat portion of a chair, the chair base being omitted. Of course it is understood that as with Figure 1, any suitable chair base may be employed. As with the previous modification, the seat construction employs a sheet metal base 60 which is formed in the desired contour of the seat construction. The outer edge of the base member 60 may be rolled as at 61 to provide a smooth edge and to impart rigidity to the base member.

Secured to the base member 60 are a plurality of chair arms, each with a chair pad. For convenience, since these are the same structurally as those of Figures 1 to 5, they have been designated by the same reference numerals as in Figures 1 to 5.

Secured to the base member 60 is a pad assembly having two layers. The pad assembly is designated in its entirety by the reference numeral 62. Basically, both the seat pad and the back pad comprise an inner resilient member of material such as foam rubber which is cemented to the base 60 except for an area adjacent the edge of the pad, and an outer pad which is cemented to the inner pad. The inner pad has snap members secured to it and the outer pad has openings aligned with these snap members and through which these snap members are accessible. The inner seat pad of the seat portion of the pad assembly is designated by the reference numeral 64 and, as best shown in Figure 9, is provided with a plurality of snap members 66 which may be spaced as shown about the periphery of a circle with one snap member in the center of the circle. As best shown in Figure 8, these snap members 66 are each fastened to the foam pad 64 by being fastened to a circular piece of cloth 67 which is adhesively secured to the foam rubber pad. The upper pad 68 is shown in plan view in Figure 10. This pad is provided with a plurality of circular openings 69 which correspond in position with the snap members 66 on pad 64. As best shown in Figure 8, these openings 69 are smaller in diameter than the pieces of cloth 67 to which the snap members 66 are secured. Thus, the pad 68, when cemented to the pad 64, serves to further retain the pieces 67 in position on the pad 64. The pad 68 is provided with a plurality of slits 70 extending substantially the full depth of the material as shown in Figures 7 and 8. As indicated in Figure 10, these slits connect each of the openings 69 and extend radially outwardly from each of the openings 69 to the outer edge of the pad.

Secured to the base 60 are a plurality of gripping members 72 of sheet metal. These gripping members are best shown in Figures 11 and 12. As best shown in Figure 12, each gripping member 72 is provided with an enlarged head portion 73 for fastening the gripping member 72 to the base 60 by suitable means such as spot welding. Each gripping member 72 has a tongue 74 struck out and extending downwardly to resiliently engage the base member 60, and to hold the cover material in position when such cover material is inserted between the tongue 74 and the base member 60. As best seen in Figure 11, these gripping members 72 are secured at uniformly spaced intervals to the base 60 in such a position that the outermost end of the gripping member is spaced inwardly from the outer edge of the base member 60.

The lower pad 64 is cemented to the base member 60 up to a point indicated by the reference character 76 in Figure 7. In other words, the pad is cemented to the base over the entire inner area and outwardly as far as it extends over the enlarged head portions 73 of the gripping members 72. The pad 68 is cemented to the pad 64 over its entire area so that the two pads, 64 and 68, after assembly, function as a single pad.

In this modification, the cover member is designated by the reference numeral 80. As with the other species, this cover member is cut so as to cover the entire area and extend substantially beyond the edges of the pad 62. The cover material 80 is provided with a plurality of snap members 82 adapted to mate with the snap members 66 secured to the pad 64. As shown, the snap members 66 are male members and the snap members 82 are female members, having a button top. After the cover is laid in position, the main portion of the cover is fastened in position by engagement of snap members 82 with snap members 66. After snapping these members together, the excess material of the cover is pushed into the slits 70. This operation may be accomplished by shoving the material into the slits by hand or by a suitable tool. When all of the cooperating snap members are fastened together, the main portion of the cover material is held firmly in position free of wrinkles. The edges of the cover material 80 are now inserted beneath the edge of pad 64. As before, the pad may be flexed upwardly to provide better access to the gripping members 72. The cover material is then forced inwardly under the tongues 74, as shown in Figure 7. Because of the resiliency of the metal of which the gripping members 72 are formed, these tongues serve to securely retain the edge portion of the cover in position. This process of tucking in the edge portion of the cover beneath the spring gripping members 72 is continued around the entire edge portion of the entire pad construction 62. It is to be understood that the back portion of the pad is formed in the same manner as the seat portion, so than one continuous piece of cover material is secured around its entire edge by the means just described.

As with the modification of Figures 1 to 5, the resilient material of the pad assembly 62 is maintained slightly compressed so that the cover material is maintained free of wrinkles. It is further to be noted that when weight is placed upon the seat assembly, as for example by an occupant, the gripping effect of members 72 is increased by reason of the force transmitted by the weight through the foam rubber pad to the gripping members 72. This compensates for any tendency of the material to be pulled out because of the stresses set up by the weight of the occupant.

If at any time, it is desired to replace the cover 80, the cover can be readily removed. It will be apparent that the snap members 82 and 66 can be readily separated to free the main portion of the cover. The edge portion of the cover may be freed by simply pulling the same firmly. The tongues 74, while they retain the cover material against accidental withdrawal, do not dig into the material and hence permit the material to be withdrawn if sufficient force is applied. The ends of the tongues may be curved upwardly slightly, if desired, to insure that the tongues will not stick into the material. Moreover, if any difficulty should be encountered in withdrawing the edge of the cover material by merely pulling on the same, this can be readily overcome by lifting the edge of the pad assembly so as to free part of the pressure exerted by gripping members 72 and to give access to these gripping members. Thus it is possible to quickly remove the entire cover 80 whenever it is desired to re-cover the chair.

It will be understood that while I have shown the type of gripping means employing gripping members 72 in combination with the snap fastener method of securing the main portion of the cover in position, either form of means for retaining the edge of the cover material in place may be employed with either form of means for fastening the main portion of the cover in position. Of course, where either of the fastening means shown in Figures 1 to 5 is employed, it is necessary that the base member be provided with a peripheral channel.

*Figures 13 and 14*

In Figures 13 and 14, I have shown a somewhat similar method of detachably fastening the cover material to the arm pads. Again, there is a base member designated by the reference character 85. This base member is channel shaped, and is provided with a layer of resilient material such as sponge rubber covering the entire area of the base member. Likewise, there is provided a pad 87 of sponge rubber or similar material which is of substantially the desired shape as the arm pad. Secured to the under side of this pad, as by cementing, is a metallic plate 88 which has struck out therefrom a plurality of tongues 89. These tongues are employed to releasably retain the edge portion of the cover material which is designated by the reference character 90. The plate 88 is provided with openings 93 (only one of which is shown), through which bolts 94 may be passed before the foam rubber is cemented thereto. The bolts 94 are adapted to extend through mating openings 95 in the base member 85. It is thus possible to draw the base member tightly against the plate 88.

To cover the chair arm, it is only necessary to cut out material by means of any suitable pattern, which is of a shape and size to cover the arm pad 87 and extend beneath the same. The material is then brought around the pad 87 with the base member 85 removed therefrom. The edge portion of the cover 90 may be hooked over the tongues 89 after being tightly drawn over the resilient pad 87. The base member is then clamped in position by means of the bolts 94. Because of the resilient pad 86, the tongues 89 are not bent inwardly, and the material can be readily removed at any time by merely removing the base member 85 and unhooking the cover material from the tongues 89.

The means for covering the chair arms is similar to the means for covering the rest of the seat construction in that it employs gripping members for detachably gripping the edge of the cover material between the gripping means and a base member. These gripping members moreover, as in the other cases, are so designed as to permit the withdrawal of the material by separation of the resilient pad from the base member.

*Conclusion*

It will be seen that I have provided a novel seat construction in which it is possible quickly to re-cover the seat construction at any time. Furthermore, my seat construction provides for the cover being firmly secured free of wrinkles over a pad providing adequate resiliency for comfort.

While I have shown certain specific modifications, it is to be understood that my invention is limited only by the scope of the appended claims.

I claim as my invention:

1. In a seat construction, a seat base, a pad of resilient material of substantially the same area configuration as said base and secured to said base except for a short peripheral portion adjacent the edge of said base, a cover extending over said pad of resilient material with the edge portion of said cover extending beneath the free edge of said pad, gripping means disposed adjacent the under side of said pad near the edge thereof to grip and detachably hold the edge portion of said cover, said gripping means being accessible upon flexure of the edge of said pad away from said base, and means for detachably securing the main portion of said cover to said base.

2. In a seat construction, a seat base, a pad of resilient material of substantially the same area configuration as said base and secured to said base except for a short peripheral portion adjacent the edge of said base, a cover extending over said pad of resilient material with the edge portion of said cover extending beneath the free edge of said pad, gripping means disposed adjacent the under side of said pad near the edge thereof to grip and detachably hold the edge portion of said cover, said gripping means being accessible upon flexure of the edge of said pad away from said base, and means for detachably securing the main portion of said cover at spaced intervals to said base to hold said cover firmly against said resilient pad.

3. In a seat construction, a seat base, a pad of resilient material of substantially the same area configuration as said base and secured to said base except for a short peripheral portion adjacent the edge of said base, said pad having a plurality of portions separated by grooves therebetween, a cover extending over said pad of resilient material with the edge portion of said cover extending under and detachably retained beneath the free edge of said pad, and a plurality of resilient members detachably secured between the opposite edges of said seat base, said resilient members extending over said cover in said grooves to resiliently hold the excess material of said cover in said grooves to maintain the main portion of said cover firmly against said pad.

4. In a seat construction, a seat base having a channel extending around the periphery of said base with the opening of said channel adjacent the upper surface of said base, a pad of resilient material of substantially the same area configuration as said base and secured to said base except for a short peripheral portion adjacent the edge of said base, a cover extending over said pad of resilient material with the edge portion of said cover extending beneath the free edge of said pad, and gripping members secured to the under side of said pad near to and extending beyond the edge thereof to extend into the channel of said base and detachably hold the edge portion of said cover against said channel, said gripping members being retractable from said channel upon sidewise compression of said pad to permit the edge of the cover to be inserted or withdrawn, and means for detachably securing the main portion of said cover to said base.

5. In a seat construction, a seat base having a channel extending around the periphery of said base with the opening of said channel adjacent the upper surface of said base, a pad of resilient material of substantially the same area configuration as said base and secured to said base except for a short peripheral portion adjacent the edge of said base, said pad having a plurality of portions separated by grooves therebetween, a cover extending over said pad of resilient material with the edge portion of said cover extending beneath the free edge of said pad, gripping members secured to the under side of said pad near to and extending beyond the edge thereof to extend into the channel of said base to detachably hold the edge portion of said cover against said channel, said gripping members being retractable from said channel upon sidewise compression of said pad to permit the edge of the cover to be inserted or withdrawn, and a plurality of resilient members having their opposite ends disposed in portions of said channel opposite to each other, said resilient members extending over said cover in said grooves between portions of said pad to resiliently hold the excess material of said cover in said grooves to maintain the main portion of said cover firmly against said pad.

6. In a seat construction, a seat base, a pad of resilient material of substantially the same area configuration as said base and secured to said base except for a short peripheral portion adjacent the edge of said base, a cover extending over said pad of resilient material with the edge portion of said cover extending beneath the free edge of said pad, and spring gripping members secured to said base adjacent the under side of said pad near the edge thereof to grip and detachably hold the edge portion of said cover between said gripping members and said base, said gripping members being accessible upon flexure of the edge of said pad away from said base, and means for detachably securing the main portion of said cover to said base.

7. In a seat construction, a seat base, a pad of resilient material of substantially the same area configuration as said base, said pad comprising two layers secured to each other with the inner layer secured to said base except for a short peripheral portion adjacent the edge of said base, a cover extending over said pad of resilient material with the edge portion of said cover extending beneath the free edge of said pad, gripping means disposed adjacent the under side of said pad near the edge thereof to grip and detachably hold the edge portion of said cover, said gripping means being accessible upon flexure of the edge of said pad away from said base, said inner layer of said pads having a plurality of snap fasteners secured thereto, the outer layer of said pads having a plurality of openings therethrough, each aligned with one of said snap fasteners, and a plurality of snap fasteners carried by said cover and adapted to mate with the snap fasteners carried by said inner layer to detachably secure the main portion of said cover to said inner layer and hence to said base.

References Cited in the file of this patent
UNITED STATES PATENTS

| | | |
|---|---|---|
| 894,020 | Levick | July 21, 1908 |
| 1,929,110 | Ferris | Oct. 3, 1933 |
| 2,288,130 | Forney | June 30, 1942 |